June 12, 1923.

J. C. CALHOUN

COLLAPSIBLE RUNNING BOARD FOR MOTOR VEHICLES

Filed April 19, 1921

1,458,519

INVENTOR.
John C. Calhoun
BY
Hardway Cathy
ATTORNEYS.

Patented June 12, 1923.

1,458,519

UNITED STATES PATENT OFFICE.

JOHN C. CALHOUN, OF HOUSTON, TEXAS.

COLLAPSIBLE RUNNING BOARD FOR MOTOR VEHICLES.

Application filed April 19, 1921. Serial No. 462,534.

*To all whom it may concern:*

Be it known that I, JOHN C. CALHOUN, a citizen of the United States, residing at Houston, in the county of Harris and State of Texas, have invented certain new and useful Improvements in a Collapsible Running Board for Motor Vehicles, of which the following is a specification.

This invention relates to new and useful improvements in a collapsible running board for motor vehicles.

One object of the invention is to provide a collapsible running board for motor vehicles which, when collapsed, serves the ordinary and usual purpose of a running board, but which may be readily converted into a table, cot, or container for carrying articles.

Another object is to provide an attachment of the character described which may be readily applied to the ordinary running board of a motor vehicle and which, when collapsed, will be neat and attractive and will not be inconvenient in use or cumbersome in appearance, and which may be easily and conveniently opened for use.

With the above and other objects in view the invention has particular relation to certain novel features of construction, operation and arrangement of parts, an example of which is given in this specification and illustrated in the accompanying drawings, wherein:—

Figure 1:
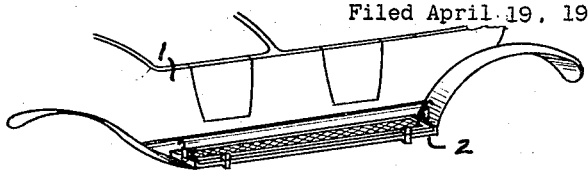
Figure 1 is a perspective view of the device, as applied to the running board of a vehicle, and collapsed.
Figure 2:
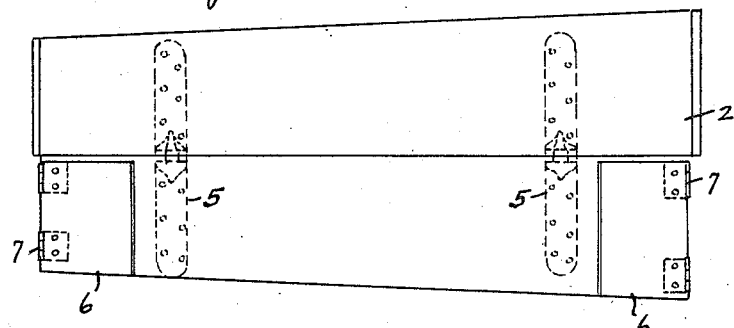
Figure 2 shows a plan view thereof in use as a table.
Figure 3:
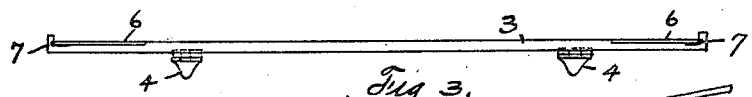
Figure 3 shows an edge view thereof.
Figure 5:
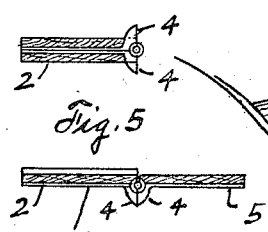
Figure 5 shows a cross sectional view of the device in collapsed position.
Figure 6:
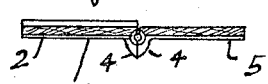
Figure 6 shows a cross sectional view thereof in open position.
Figure 4:
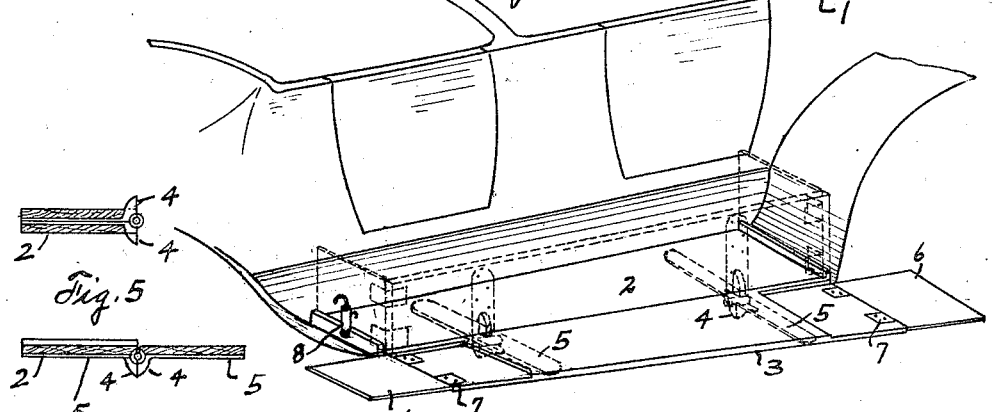
Figure 4 shows an enlarged perspective view thereof, showing the device as used for a cot, also showing the same, in dotted lines, as used for a container.

Referring now more particularly to the drawings, the numeral 1 designates the vehicle and the numeral 2 designates the running board thereof. Hinged to the outer edge of the running board 1 there is an extension board 3 which may be folded over and will lie upon the board 1, as shown in Figures 1 and 5. The extension board in this position exactly coincides with the running board and forms, in effect, a two-ply running board and is properly finished to give a harmonious appearance with the vehicle. The extension board may be unfolded, or brought into alignment with the running board, as shown in Figures 2 and 4, and will be supported in this position by the abutting shoulders 4, 4 of the hinges 5, 5; and when in this position will serve as a table.

The extension board has its upper face countersunk, at each end, and has extension ends 6, 6 hinged thereto at each end. These ends may be extended, as shown in Figure 4, and will be supported in extended position by their hinges 7, 7, and in this position will form a comfortable cot. When folded over these ends lie in the countersunk portions of the extension board and are flush therewith so as not to be in the way when the device is used as a table, and will permit the extension board to lie closely upon the running board when the device is collapsed.

When a container is desired the extension board 3 may be brought into vertical position and the ends 6, 6 may be brought into right angular position, relative thereto. Their free ends are formed to conform to the contour of the adjacent side of the vehicle body and to fit closely thereagainst. The device is held in this position by means of suitable holders 8, 8 carried by the running board and adapted to engage with said ends. When in collapsed position these holders are adapted to hold the parts securely together.

This device may be readily applied to any type of automobile and will be useful, at all times, for carrying purposes, and will also be particularly useful in making long trips and excursions where a table or cot will be required and at the same time it will not mar the appearance of the car.

What I claim is:—

The combination with an automobile running board, of an extension board, hinges connecting the extension board to the outer edge of the running board, said hinges permitting the extension board to lie in coinciding position on the running board or to stand vertical relative thereto, shoulders carried by the hinges, said shoulders abutting when the extension board is extended into a common plane with the running board so as to support the extension board in the last mentioned position, said extension board having countersunk end sections, extensible ends hinged to the ends of the extension board, said ends being foldable into said countersunk sections and being adapted to stand vertical relative to the running board when said extension is in vertical position and to lie in said countersunk sections between the extension board and running board when the extension board is folded into coinciding position relative to the running board, said extensible ends being adapted to be extended out each way into a common plane with the extension board when said extension board is in extended position relative to the running board, the hinged ends of said end boards abutting against the adjacent ends of the extension board when said boards are in extended position and holding said end boards in said extended position, and holders adapted to engage with said ends to hold the ends and extension board in vertical position and also adapted to engage with the ends of the collapsed structure to hold the same in collapsed position.

In testimony whereof I have signed my name to this specification in the presence of two subscribing witnesses.

JOHN C. CALHOUN.

Witnesses:
 WM. A. CATHEY,
 LOUISE CATHEY.